(12) United States Patent
Troyer

(10) Patent No.: US 9,403,194 B2
(45) Date of Patent: Aug. 2, 2016

(54) CERAMIC WEAR TILE AND METHOD OF USING SAME

(71) Applicant: CerCo LLC, Shreve, OH (US)

(72) Inventor: Gary C. Troyer, Shreve, OH (US)

(73) Assignee: CERCO LLC, Shreve, OH (US)

( * ) Notice: Subject to any disclaimer, the term of this patent is extended or adjusted under 35 U.S.C. 154(b) by 0 days.

(21) Appl. No.: 15/065,993

(22) Filed: Mar. 10, 2016

(65) Prior Publication Data

US 2016/0184868 A1 Jun. 30, 2016

Related U.S. Application Data

(62) Division of application No. 14/300,485, filed on Jun. 10, 2014, now Pat. No. 9,352,360.

(60) Provisional application No. 61/836,781, filed on Jun. 19, 2013.

(51) Int. Cl.
*B07C 5/342* (2006.01)
*F27B 9/20* (2006.01)
*C04B 35/10* (2006.01)

(52) U.S. Cl.
CPC .............. *B07C 5/3425* (2013.01); *C04B 35/10* (2013.01); *F27B 9/20* (2013.01); *C04B 2235/3217* (2013.01); *C04B 2235/3232* (2013.01); *C04B 2235/3241* (2013.01); *C04B 2235/3267* (2013.01); *C04B 2235/3272* (2013.01); *C04B 2235/445* (2013.01)

(58) Field of Classification Search
CPC .................. C04B 35/10; C04B 35/111; C04B 2235/3217; C04B 2235/3262; C04B 2235/3263; C04B 2235/3265; C04B 2235/3267; C04B 2235/3268; C04B 2235/3272; C04B 2235/3274; C04B 2235/3232; C04B 2235/3241; C04B 2235/3243; C04B 2235/445
USPC .................. 501/145, 153; 428/220, 697, 702; 209/552, 576, 580
See application file for complete search history.

(56) References Cited

U.S. PATENT DOCUMENTS

| | | |
|---|---|---|
| 5,957,398 A | 9/1999 | Ogata et al. |
| 6,129,967 A | 10/2000 | Young et al. |
| 2007/0022671 A1 | 2/2007 | Plemmons et al. |
| 2013/0136909 A1 | 5/2013 | Mauro et al. |

*Primary Examiner* — Jeffrey Shapiro
(74) *Attorney, Agent, or Firm* — Matthew T. Waters; Rankin, Hill & Clark LLP

(57) ABSTRACT

The present subject matter provides colored wear tiles for use in optical sorting apparatuses and related methods that separate an associated material into a desired product and an undesired product. The colored wear tiles have a color and/or lightness value that permeates the entire body of the wear tile and sufficiently differs from the color and/or lightness of the associated material in order to allow the colored wear tile, or portions or pieces thereof, that may mix with the associated material, to be separated from the desired product by the sorting apparatus.

10 Claims, 2 Drawing Sheets

CERAMIC WEAR TILE AND METHOD OF USING SAME

CROSS REFERENCE TO RELATED APPLICATION

The present application claims priority upon the co-pending U.S. patent application Ser. No. 14/300485 filed Jun. 10, 2014, which claimed priority upon U.S. Provisional Patent Application Ser. No. 61/836,781 filed Jun. 19, 2013, both of which are incorporated herein by reference.

FIELD

The present subject matter relates to colored wear tiles used in various sorting devices and related methods.

BACKGROUND

Many processes are known for sorting and separating material. These processes are often mechanical in nature and performed by an automated machine or apparatus that is controlled by a computer. These sorting machines, or portions thereof, can experience wear attendant to contact with associated material during sorting operations. Often these parts are made from stainless steel and can have service lives of up to one year depending on thickness. Wear tiles are often applied to these steel portions of the machines that are subject to such wear in order to extend the working life of the parts and the machine as a whole. The wear tile is used as a barrier between the associated material and the machine parts so that the wear tile itself is worn away, rather than the machine parts being worn.

The material to be sorted is normally separated into two or more groups. These groups can include for example, a group of material that is acceptable or desired for use or consumption (i.e., desired product), and a group that is not acceptable or undesired for use or consumption (i.e., undesired product).

Various characteristics or properties of the material are used as the basis for separating the material into these groups. Parameters are established for sorting out undesired material from desired material based on the properties being monitored. Often, optical and/or physical properties of the material are monitored and used as the basis for separation. In these cases, material is normally sorted with optical scanning systems that employ cameras, lights, and sensors of various kinds to monitor or detect certain properties of the material for example, size, color, transparency or opacity, reflectivity, infra-red absorption/reflectivity, combinations thereof, and the like.

If wear tiles are introduced into a sorting machine, the wear tiles, or portions thereof may chip from the wear tiles during sorting operations and inadvertently mix with the material to be sorted. Standard wear tiles used in sorting machines are various shades of white resulting from the material components used to form the tiles. When used in machines using optical sorters for the separation of food products such as white rice, for example, white wear tiles are inadequate. White wear tiles do not exhibit optical properties sufficiently different from the optical properties of the white rice—or other material with shades of white—in order to allow the optical scanning system to separate chipped white wear tile from the desired product.

SUMMARY

The difficulties and drawbacks associated with previously known wear tiles and sorting methods are overcome in the present colored wear tiles and related apparatuses and methods.

In one aspect of the present subject matter, a sorting apparatus is provided comprising a feed, an implement, and wear tiles. The feed delivers a material to be sorted to the implement. The implement sorts the material into at least two groups based on one or more characteristics of the material including a color parameter, one of the at least two groups comprising desired product and the other of the at least two groups comprising an undesired product. The wear tiles cover a portion of the sorting apparatus to substantially prevent the material from contacting the covered portion of the sorting apparatus during sorting. The wear tiles have a color sufficiently different from a color of the desired product such that the wear tiles, or portions or pieces thereof, that may mix with the material are sorted by the implement from the desired product.

In another aspect of the present subject matter, a method is provided for separating a material into at least two groups based on characteristics of the material, the characteristics including a color parameter and a lightness parameter. The method comprises providing the material to be separated. The method includes providing a sorting apparatus having a feed, a sorting implement, and colored wear tiles; wherein the feed transports the material to the sorting implement, the sorting implement separates the material into at least two groups based on the characteristics of the material, the colored wear tiles cover portions of the apparatus to substantially prevent the covered portions from coming into contact with the material, and the colored wear tiles have a color and a lightness. The method also comprises passing the material through the sorting apparatus to separate the material into the at least two groups, one of the at least two groups comprising desired product having a color and lightness, the other of the at least two groups comprising undesired product. The sorting implement separates the colored wear tiles, or portions or pieces thereof, that may mix with the material, from the desired product based on differences between the color and lightness of the colored wear tiles and the color and lightness of the desired product.

In another aspect of the present subject matter, an apparatus is provided for separating portions of a material into a desired product portion and an undesired product portion, wherein the separating is based on perceptible characteristics of the material, one of the perceptible characteristics being color. The apparatus comprises a delivery system for transporting the material to be sorted; a divider for separating the desired product from the undesired product, and colored wear tiles covering portions of the apparatus that otherwise would be subject to wear from coming into contact with the material. The colored wear tiles have a color that permeates substantially an entire mass of the colored wear tiles. The color of the colored wear tiles is sufficiently different from the color of the material such that the divider is able to separate the colored wear tiles, or portions or pieces thereof that may mix with the material, from the desired product portion. The delivery system transports the material to the divider, and the divider separates the material.

In another aspect of the present subject matter, a method is provided for protecting one or more surfaces of an optical sorting apparatus that are subject to wear. The apparatus is configured to sort a material based on characteristics including color. The wear is associated with the material contacting the one or more surfaces. The method comprises covering the one or more surfaces with colored wear tiles so as to substantially prevent the material from contacting the one or more surfaces. The material is sorted into two or more groups, one of the two or more groups comprising desired product having a color, the other of the two or more groups comprising undesired product. The colored wear tiles have a color that permeates substantially an entire mass of the colored wear tiles, the color of the colored wear tiles being different from the color of the desired product. The colored wear tiles, or portions or pieces thereof, that may mix with the material are separated from the desired product by the apparatus on the basis of a difference between the color of the colored wear tiles and the color of the desired product.

In another aspect of the present subject matter, a colored wear tile is provided for inhibiting wear to a surface, the wear being associated to contact with a moving material. The colored wear tile comprises prior to firing, non-volatile components comprising at least 85% $Al_2O_3$ by weight ("wt. %"). The colored wear tile comprises prior to firing, $Al_2O_3$ from at least 75 wt. % of the total weight of the volatile and non-volatile components and excluding water. The colored wear tile has a color that permeates substantially an entire mass of the colored wear tile. The colored wear tile has a Vickers hardness from about 900HV5 to about 1350HV5. The colored wear tile has a thickness of less than about 0.60 inches. The colored wear tile has a lightness of about 90 or less measured with a CIE D65 illuminant at 10 degrees.

The colored wear tile in accordance with the present subject matter provides sufficient difference in color and/or lightness from the material to be sorted, in order to allow optical scanning machines to separate the wear tiles, or portions thereof, from the desired product. Related apparatuses and methods employing the colored wear tile provide improved sorting performance over the traditional use of white wear tiles.

As will be realized, the present subject matter is capable of other and different embodiments and its several details are capable of modifications in various respects, all without departing from the present subject matter. Accordingly, the description is to be regarded as illustrative and not restrictive.

BRIEF DESCRIPTION OF THE DRAWINGS

These, as well as other features, aspects, and advantages of the present subject matter, will be more completely understood and appreciated by referring to the following more detailed description of the exemplary embodiments of the present subject matter in conjunction with the accompanying drawings.

FIGS. 1A-1G are schematic, perspective views of wear tiles in accordance with the present subject matter.

DETAILED DESCRIPTION OF THE EMBODIMENTS

Figure 1G:
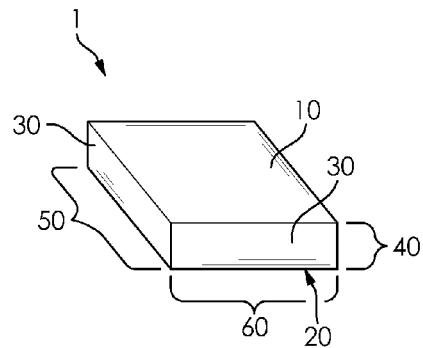
Figure 1G:
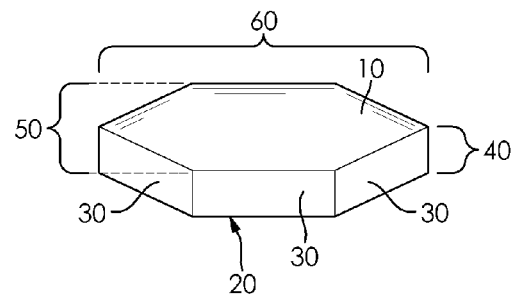
Figure 1G:
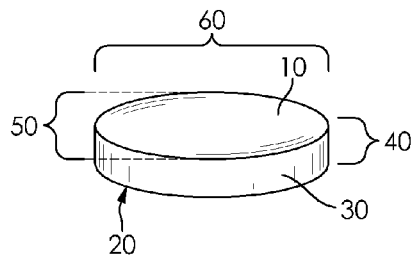
Figure 1G:
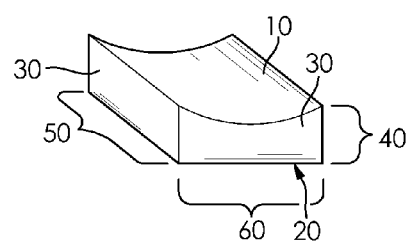
Figure 1G:
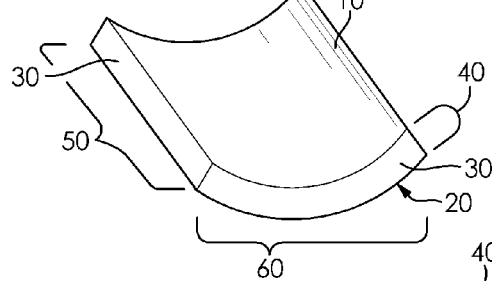
Figure 1G:
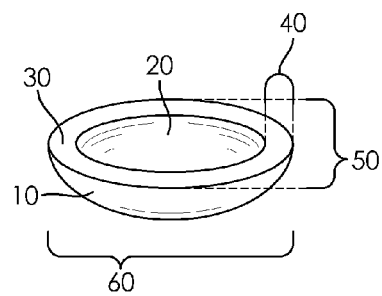
Figure 1G:
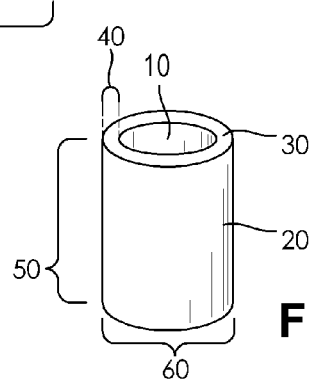

The present subject matter provides colored wear tiles that are used in optical sorting apparatuses and related methods for separating an associated material into at least two groups, the two groups comprising a desired product group and an undesired product group. The colored wear tiles provide protection to portions of the optical sorting apparatus from wear that occurs from contact with the associated material. The wear tile has a color characteristic and/or a lightness characteristic that are different from the color and/or lightness characteristics of the associated material such that optical systems used in the sorting apparatus are able to monitor and detect these differences, whereby pieces or portions of the wear tile that may mix with the material during sorting operations are separated from the desired product by the sorting apparatus.

By "portions" or "pieces", it is meant fragments or parts of the wear tiles that are optically significant. By "optically significant", it is meant a fragment of the wear tile having a size that is large enough to be separated from the desired product by the sorting machine. A more detailed description of the colored wear tiles, sorting apparatuses, and methods is provided below in reference to the figures.

Size and Shape

In accordance with the present subject matter, and in reference to FIGS. 1A-1D, a colored wear tile 1 has an exposed surface 10 that comes into contact with an associated material during sorting, a back surface 20 used to attach the tile 1 to the portion of the sorting apparatus subject to wear, and one or more side surfaces 30. The tiles have a size and shape adapted to be mounted on portions of an optical sorting apparatus in order to prevent wear on those portions that come into contact with associated material during sorting.

Except for having a thickness 40 of about 0.60 inches or less, the shape or form of the "tile" is not particularly limited. Therefore, the term "tile" should not be construed as being restrictive in regard to shape, size, and proportions of the wear tile. The colored wear tile of the present subject matter can have any shape, size, form, or proportions and is not limited to standard "tile" sizes such as those having a thickness 40 that is significantly smaller than a length 50 and width 60, such as is domestic tile applications. Rather, the present subject matter contemplates wear tiles that have flat surfaces (e.g. exposed surface 10 in FIG. 1A), curved/contoured surfaces (e.g. exposed surface 10 in FIG. 1D), or combinations thereof (e.g. exposed surface 10 and back surface 20 in FIG. 1 D) and have a thickness 40 that is equal to, greater, or less than either or both the width 60 and length 50 of the tile 1. The tile can be a unitary, pre-formed single-piece wear member that lines or covers the entirety of a structure or part(s) thereof. The tile can be in the form of a cylinder (FIG. 1G), a brick, a square or rectangular tile (FIG. 1A), a hexagonal tile (FIG. 1B), a circular tile (FIG. 1C), a cupped tile (FIG. 1F), a contoured rectangular tile (FIGS. 1D, and 1E), or can be assembled into a pre-matted multi-tile configuration mounted on a backing material, such as a polymer film, for covering contoured or curved portions of a sorting apparatus.

The shape of the tile is not particularly limited and the exposed surface 10 of the tile can be for example square, rectangle, circular, hexagon, octagon, or any other shape that is flat or contoured, that is suitable for an intended use.

In one embodiment, the average thickness 40 of the tile after firing is less than about 0.60 inches. The other dimensions 50, 60 of the fired tile are not particularly critical and can be sized according to the intended application. In one embodiment, the wear tile has a length 50 and a width 60, both ranging from about 0.5 to about 10 inches.

In one embodiment in accordance with the present subject matter, a colored wear tile is provided for inhibiting wear to a surface, the wear being associated to contact with a moving material. The colored wear tile comprises prior to firing, non-volatile components that comprise at least 85% $Al_2O_3$. This wt. % for $Al_2O_3$ excludes the weight of water and other components that volatilize during drying or firing that are in the composition prior to drying and firing. The composition of the wear tile, prior to firing, includes $Al_2O_3$ from at least 75 wt. % of the weight of the volatile and non-volatile components, excluding water. The colored wear tile has a color that permeates substantially an entire mass of the colored wear tile. That is, the color permeates the tile from the exposed surface 10 to the back surface 20, and between the side surfaces 30. The colored wear tile has a Vickers hardness from about 900HV5 to about 1350HV5. The colored wear tile has a thickness of less than about 0.60 inches. The colored wear tile has a lightness of about 90 or less measured with a CIE D65 illuminant at 10 degrees.

Color and Lightness

As described herein, the wear tiles have characteristics (at least a color value and/or lightness value) that are sufficiently different from respective characteristics of the desired product and/or the material as a whole, such that an optical sorting apparatus can detect and separate the wear tile, or portions thereof, from the desired product. The wear tile may have other characteristics different from those of the desired product that are not limited to color and lightness, but may encompass other perceptible characteristics such as density, size, reflectivity, infra-red absorption/reflectivity, combinations thereof, etc. Thus the present subject matter wear tiles are not limited to having only a color and lightness value that are different from that of the desired product but may also possess other properties that are dissimilar to the desired product.

Additionally, the colored wear tiles can have characteristics that are different from the associated material or different from both the associated material and the desired product. In other words, the colored wear tile has characteristics that are dissimilar to the desired product, but may or may not also have characteristics that are dissimilar to the undesired product portion. For example the wear tiles and the undesired product may have similar lightness and color, both being sufficiently different from the desired product to allow for separation therefrom. On the other hand, the wear tiles may have a color and lightness different from the entirety of the associated material. In either case, the colored wear tile, or portions thereof, will be separated from the desired product by the sorting apparatus.

In accordance with the present subject matter, the color and/or lightness of the tiles contrasts with the desired product, e.g., the tiles may have a different lightness value and/or a different color value on the Hunter Lab scale as compared with the desired product.

In the Hunter Lab scale, (also known as the CIELAB scale and named for the variables L, a, and b), L measures lightness or luminance and varies from 100 for perfect white to zero for black, approximately as the eye would evaluate it. Where DL=L (wear tile)−L (desired product). If DL (or $\Delta L$) is positive, the wear tile is lighter than the desired product. If DL is negative, the wear tile is darker than the desired product.

The chromaticity dimensions (a and b) give understandable designations of color. The (a) dimension measures redness when positive, gray when zero, and greenness when negative. Where Da=a(wear tile)−a(desired product). If Da (or $\Delta a$) is positive, the wear tile is redder than the desired product. If Da is negative, the sample is greener than the desired product.

The (b) dimension measures yellowness when positive, gray when zero, and blueness when negative. Where Db=b (wear tile)−b(desired product). If Db (or $\Delta b$) is positive, the wear tile is yellower than the desired product. If Db is negative, the wear tile is bluer than the desired product.

The Hunter total color difference (DE or $\Delta E$) for any illuminant or observer is calculated as $\Delta E=\sqrt{(\Delta L^2+\Delta a^2+\Delta b^2)}$. In one embodiment, the total color difference (DE) between the tiles and the desired product is about 10 or more.

In one embodiment of the present subject matter, the tile provides a contrasting lightness values (L) as compared with that of the desired product and providing a lightness value difference ($\Delta L$) between that of the tile and that of the desired product as determined by the standard CIELAB scale. In another embodiment, the tile provides contrasting color values (a and b) from that of the desired product. In yet another embodiment, the tile provides lightness values, color values, and combinations thereof to provide contrast from the desired product.

In one embodiment in accordance with the present subject matter, the difference in lightness values $\Delta L$ between the tile and desired product has an absolute value of greater than about 10. In another embodiment, the absolute value of $\Delta L$ is greater than about 20, and in still another embodiment greater than about 25. In a particular embodiment, the absolute value of $\Delta L$ is about 30 or higher. The tile used in accordance with the present subject matter and corresponding L, a, and b values for those tile are measured with a spectrophotometer.

In accordance with the present subject matter, the wear tiles are such that the color and/or lightness value permeates the entire mass of the tile, or at least substantially so. In other words, the color is infused throughout the tile body running through the bulk of the tile, rather than just on or near one or more surfaces of the tile. In contrast, domestic tiles used for decoration or other similar purposes only have a color at a surface thereof, wherein a colored glaze is applied atop the tile and fired wherein the color does not substantially penetrate the body of the tile but rather, is only on a surface thereof.

As the present subject matter tiles are worn, color is always displayed at the exposed surface 10 because the color in the wear tiles runs substantially throughout the mass of the tiles. In other words, the color within the bulk of the wear tile is continually displayed at the exposed surface 10 of the tile 1 as the tile wears away due to exposure and contact with the associated material. For example, if any tile or piece of a tile happens to chip off and mix with the associated material, then that portion of the tile will have color and/or lightness different than the color and/or lightness of the desired product. Because the portion of the tile has color, it will be easily separated from the desired product by the optical sorter. Further, the portion of the tile that was underneath the chipped off portion becomes the exposed surface and will also display the color of the wear tile. In one embodiment, the color in the wear tile is substantially uniform throughout the mass of the tile.

In another embodiment, a small color or lightness gradient is present through the mass of the wear tile from one surface to another. In one aspect, the gradient can transition from one lightness value to another (i.e., change in L value); for example, from a dark shade of a color to a lighter shade of the same color. In another aspect, the gradient can transition from one color to a different color (i.e. change in a and b values). In these gradient aspects, the gradient through the mass of the wear tile can help aid in determining the level of wear experienced by the wear tile and an indication that the wear tile should be replaced with a new tile. A combination of these two aspects (i.e. lightness and color gradients) is also contemplated. In any event, the gradient values of lightness and/or color through the mass of the tile as compared to the lightness and color of the desired product is such that the optical sorter can separate the wear tile, or portions thereof, from the desired product.

The wear tiles can be of any color and lightness, as long as the color and lightness are sufficiently different from that of the desired product to allow optical sorters to separate pieces of the wear tile from the desired product. Although not limited to such, in various embodiments in accordance with the present subject matter the wear tiles are brown, pink, blue or black.

Composition and Preparation

The color and lightness of the colored wear tile is largely affected by the composition and preparation techniques.

Ordinarily, domestic tiles comprise a relatively low level of $Al_2O_3$ (i.e., under 30 wt. %) and are not sufficiently hard for use as wear tiles in optical sorters. In contrast, traditional wear tiles consist essentially of $Al_2O_3$, which when fired, produces acceptably hard tiles that display shades of white. One problem with such wear tiles is that their various shades of white color makes them unsuitable for use in automated optical sorters used to separate associated material that also has shades of white color, such as white rice. Introduction of other ingredients to these white wear tiles may impart color, but may also compromise hardness and usefulness of the tile for use as a wear tile.

In this regard, colored wear tiles in accordance with the present subject matter are produced by firing a composition containing prior to firing non-volatile components comprising at least 85 wt. % $Al_2O_3$. This wt. % for $Al_2O_3$ excludes the weight of water and other components that volatilize during drying or firing that are in the composition prior to drying or firing. Further, the composition contains prior to firing, $Al_2O_3$ from at least 75 wt. % of the total weight of the volatile and non-volatile components and excluding water. The composition is fired to produce a wear tile having a Vickers hardness from about 900HV5 to about 1350HV5 is produced. A preferred hardness for the colored wear tile is a Vickers hardness from about 1100HV5 to about 1350HV5. A hardness of about 900HV5 to about 1350HV5 ensures a suitable service life for the wear tiles and protection for sorting machines, and is attained by firing the compositions listed herein. Such hardness values are not realized in domestic tiles.

The colored wear tile has a thickness of less than about 0.60 inches. The colored wear tile has a lightness of about 90 or less measured with a CIE D65 illuminant at 10 degrees. The colored wear tile has an exposed surface defined by a shape selected from the group consisting of a square shape, a rectangle shape, a circular shape, a hexagon shape, and combinations thereof. Other shapes are also contemplated as part of the present subject matter.

In one embodiment, the wear tile is produced by firing a composition comprising prior to firing:
   a. $Al_2O_3$ from about 75 wt. % to about 98 wt. %,
   b. $MnO_2$ from about 0.25 wt. % to about 3.5 wt. %,
   c. $TiO_2$ from about 0.1 wt. % to about 2.5 wt. %,
   d. $Fe_3O_4$ from about 0.1 wt. % to about 2.5 wt. %,
   e. clay from about 0 wt. % to about 10 wt. %,
   f. $Al_2SiO_5$ from about 0.01 wt. % to about 8.0 wt. %,
   g. talc from about 0 wt. % to about 3.5 wt. %,
   h. dispersant from about 0 wt. % to about 2.0 wt. %,
   i. defoamer from about 0 wt. % to about 1.0 wt. %,
   j. binder from about 0.1 wt. % to about 10 wt. %, and
   k. calcium stearate from about 0 wt. % to about 4.5 wt. %
In one aspect, firing the composition produces a brown wear tile.

In another embodiment the colored wear tile is produced by firing a composition comprising prior to firing:
   a. $Al_2O_3$ from about 75 wt. % to about 98 wt. %,
   b. $MnO_2$ from about 0.5 wt. % to about 2.0 wt. %,
   c. $TiO_2$ from about 0.1 wt. % to about 1.5 wt. %,
   d. $Fe_3O_4$ from about 0.1 wt. % to about 1.5 wt. %,
   e. clay from about 1.0 wt. % to about 3.5 wt. %,
   f. $Al_2SiO_5$ from about 0.5 wt. % to about 6.0 wt. %,
   g. talc from about 0.2 wt. % to about 1.5 wt. %,
   h. dispersant from about 0.2 wt. % to about 0.6 wt. %,
   i. defoamer from about 0.05 wt. % to about 0.2 wt. %,
   j. binder from about 0.5 wt. % to about 8.0 wt. %, and
   k. calcium stearate from about 0.3 wt. % to about 3.5 wt. %
In one aspect, firing the composition produces a brown wear tile.

In another embodiment the colored wear tile is produced by firing a composition comprising prior to firing:
   a. $Al_2O_3$ from about 75 wt. % to about 98 wt. %,
   b. $CaF_2$ from about 0.1 wt. % to about 4.0 wt. %,
   c. $Cr_2O_3$ from about 0.05 wt. % to about 3.0 wt. %,
   d. clay from about 0 wt. % to about 4.5 wt. %,
   e. talc from about 0 wt. % to about 4.0 wt. %,
   f. tannic acid from about 0 wt. % to about 3.5 wt. %,
   g. dispersant from about 0 wt. % to about 3.0 wt. %,
   h. defoamer from about 0 wt. % to about 2.0 wt. %,
   i. binder from about 0 wt. % to about 10.0 wt. %, and
   j. calcium stearate from about 0 wt. % to about 4.5 wt. %.
In one aspect, firing the composition produces a pink wear tile.

In another embodiment the colored wear tile is produced by firing a composition comprising prior to firing:
   a. $Al_2O_3$ from about 75 wt. % to about 98 wt. %,
   b. $CaF_2$ from about 0.5 wt. % to about 3.0 wt. %,
   c. $Cr_2O_3$ from about 0.1 wt. % to about 2.0 wt. %,
   d. clay from about 1.0 wt. % to about 3.5 wt. %,
   e. talc from about 0.2 wt. % to about 3.0 wt. %,
   f. tannic acid from about 0.05 wt. % to about 2.0 wt. %,
   g. dispersant from about 0.2 wt. % to about 1.0 wt. %,
   h. defoamer from about 0.02 wt. % to about 0.2 wt. %,
   i. binder from about 0.7 wt. % to about 7.5 wt. %, and
   j. calcium stearate from about 0.1 wt. % to about 3.5 wt. %.
In one aspect, firing the composition produces a pink wear tile.

In another embodiment the colored wear tile is produced by firing a composition comprising prior to firing:
   a. $Al_2O_3$ from about 75 wt. % to about 98 wt. %,
   b. $Al_2SiO_5$ from about 0.01 wt. % to about 8.0 wt. %,
   c. $Cr_2O_3$ from about 0.05 wt. % to about 3.0 wt. %,
   d. clay from about 0 wt. % to about 10.0 wt. %,
   e. talc from about 0 wt. % to about 4.0 wt. %,
   f. Stonelite ($CaMg(CO_3)_2$—$Fe_2O_3$) or dolomite ($CaMg(CO_3)_2$) from about 0 wt. % to about 3.5 wt. %,
   g. dispersant from about 0 wt. % to about 3.0 wt. %,
   h. defoamer from about 0 wt. % to about 2.0 wt. %,
   i. binder from about 0 wt. % to about 10.0 wt. %, and
   j. calcium stearate from about 0 wt. % to about 4.5 wt. %.
In one aspect, firing the composition produces a pink wear tile.

In another embodiment the colored wear tile is produced by firing a composition comprising prior to firing:
   a. $Al_2O_3$ from about 75 wt. % to about 98 wt. %,
   b. $TiO_2$ from about 0.5 wt. % to about 5.0 wt. %,
   c. CoO from about 0 wt. % to about 3.0 wt. %,
   d. $Fe_3O_4$ from about 0 wt. % to about 3.0 wt. %,
   e. $NiO_2$ from about 0 wt. % to about 3.0 wt. %,
   f. Kaolin clay ($Al_2Si_2O_5(OH)_4$) from about 1.0 wt. % to about 8.0 wt. %,
   g. dispersant from about 0 wt. % to about 3.0 wt. %,
   h. defoamer from about 0 wt. % to about 2.0 wt. %,
   i. binder from about 0 wt. % to about 5.0 wt. %, and
   j. calcium stearate from about 0 wt. % to about 3.5 wt. %.
In one aspect, firing the composition produces a black wear tile.

In another embodiment the colored wear tile is produced by firing a composition comprising prior to firing:
   a. $Al_2O_3$ from about 75 wt. % to about 98 wt. %,
   b. $Al_2SiO_5$ from about 0.5 wt. % to about 8.0 wt. %,
   c. clay from about 0 wt. % to about 10.0 wt. %,
   d. talc from about 0 wt. % to about 4.0 wt. %,
   e. Stonelite ($CaMg(CO_3)_2$—$Fe_2O_3$) or dolomite ($CaMg(CO_3)_2$) from about 0 wt. % to about 3.5 wt. %,
   f. CoO from about 0 wt. % to about 3.0 wt. %, g. dispersant from about 0 wt. % to about 3.0 wt. %,
h. defoamer from about 0 wt. % to about 2.0 wt. %,
i. binder from about 0 wt. % to about 5.0 wt. %, and
j. calcium stearate from about 0 wt. % to about 3.5 wt. %.

In one aspect, firing the composition produces a blue wear tile.

In one aspect white crystalline non-fibrous calcined alumina powder is used as the source for $Al_2O_3$. A suitable grade of calcined alumina may contain trace amounts (<0.5%) of $SiO_2$, $Fe_2O_3$, $Na_2O$, and has a loss on ignition from 300-1200° C. of about 0.15%. Suitable commercially available grades of calcined alumina include AC-2 Alumina from AluChem, Inc., Cincinnati, Ohio or GMU-C grade calcined alumina.

In one aspect, the clay used to produce the wear tile comprises ball clay. Ball clay is used for imparting workability, plasticity, and strength to the mixed composition in drying. Ball clay comprises kaolinite, mica, and quartz and has a chemical formula $Al_2O_3$-$2SiO_2$-$2H_2O$ and having a loss on ignition of about 12%. Ball clay may include other impurities such as $SiO_2$ and $TiO_2$. One suitable commercially available grade of ball clay includes Champion and Challenger (C&C) Ball Clay, supplied by Laguna Clay Company, City of Industry, California. In another aspect, the clay used to produce the wear tile comprises kaolin clay. Kaolin clay is ceramic kaolin which offers very white fired color, good forming characteristics, high green strength, and good suspension capabilities and cleanliness. Kaolin clay has a chemical formula $Al_2O_3$-$2SiO_2$-$2H_2O$ and has a loss on ignition of about 14%. One suitable commercially available grade of kaolin clay is Edgar Plastic Kaolin (EPK) clay supplied by Edgar Minerals, Edgar, Fla.

In one aspect, Kyanite is used as the source for $Al_2SiO_5$.

In one aspect, the talc used to produce the wear tile comprises American talc supplied by the American Talc Company, Van Horn, Tex.; or Milwhite TDM 92 talc supplied by Milwhite Inc., Laredo, Tex.

In one aspect, the dispersant comprises ammonium polyacrylate. The dispersant is in liquid form and has about 40% solids loading. The ammonium polyacrylate has a molecular weight of about 3500. The dispersant is used to lower the viscosity and to inhibit settling or agglomeration of particulate solids in the composition and to facilitate adequate dispersion. One suitable commercially available ammonium polyacrylate for use as a dispersant is Darvan 821A, supplied by Vanderbilt Minerals, LLC, Norwalk, Conn.

In one aspect, the defoamer used in the composition comprises a complex alcohol containing material. One suitable commercially available defoamer is Foamaster®A, supplied by Cognis, Monheim, Germany.

In one aspect, the binder used is an aqueous, acrylic emulsion used for enhancing green strength of the wear tiles. A suitable commercially available grade is Duramax™ B-1022 supplied by Dow Chemical Company, Wilmington, Del. In another aspect, the binder used is a low Tg acrylic aqueous emulsion. A suitable commercially available grade is Duramax™ B-1000 also supplied by Dow Chemical Company. In another aspect, the binder used is a polyvinyl alcohol. One suitable commercially available grade is Selvol™203 supplied by Sekisui Chemical Company, Ltd. In another aspect, the binder used is a polyethylene glycol ("PEG") having an average molecular weight of between 4000 daltons ("PEG 4000") and 8000 daltons ("PEG 8000"). In one aspect, PEG with a molecular weight of about 4600 ("PEG 4600") is used.

The compositions can optionally include water or one or more other vehicles. The amount of water present in the slurry may be any amount suitable to provide uniform distribution and mixing of the components. Other additives may also be added to the composition including tannic acid, fluorspar ($CaF_2$), other oxides from those mentioned above, such as Chrome III Oxide ($Cr_2O_3$), other binders, pH adjusting agents, sintering aids, and plasticizers, for example.

Production methods for colored wear tiles in accordance with the present subject matter are not particularly limited. Any production method that satisfactorily mixes the components is suitable. Generally, the components are combined to form a slurry and the slurry is dried and milled to form a free flowing powder. The powder is cold or dry pressed to form a green body having a particular shape. The green body is then fired at high temperatures to remove volatile contents including the binder, and to sinter the remaining components to form the wear tiles.

Standard drying and firing techniques can be used in accordance with the present subject matter.

In one embodiment, the method of production comprises mixing the components in a mill, adding water to the mixed components to form a liquid suspension, spray drying the composition to remove the water, cold pressing the composition into the desired form, and firing the cold pressed composition at or above about 2500° F. from about 45 minutes to about 90 minutes.

Apparatuses

Figure 2:
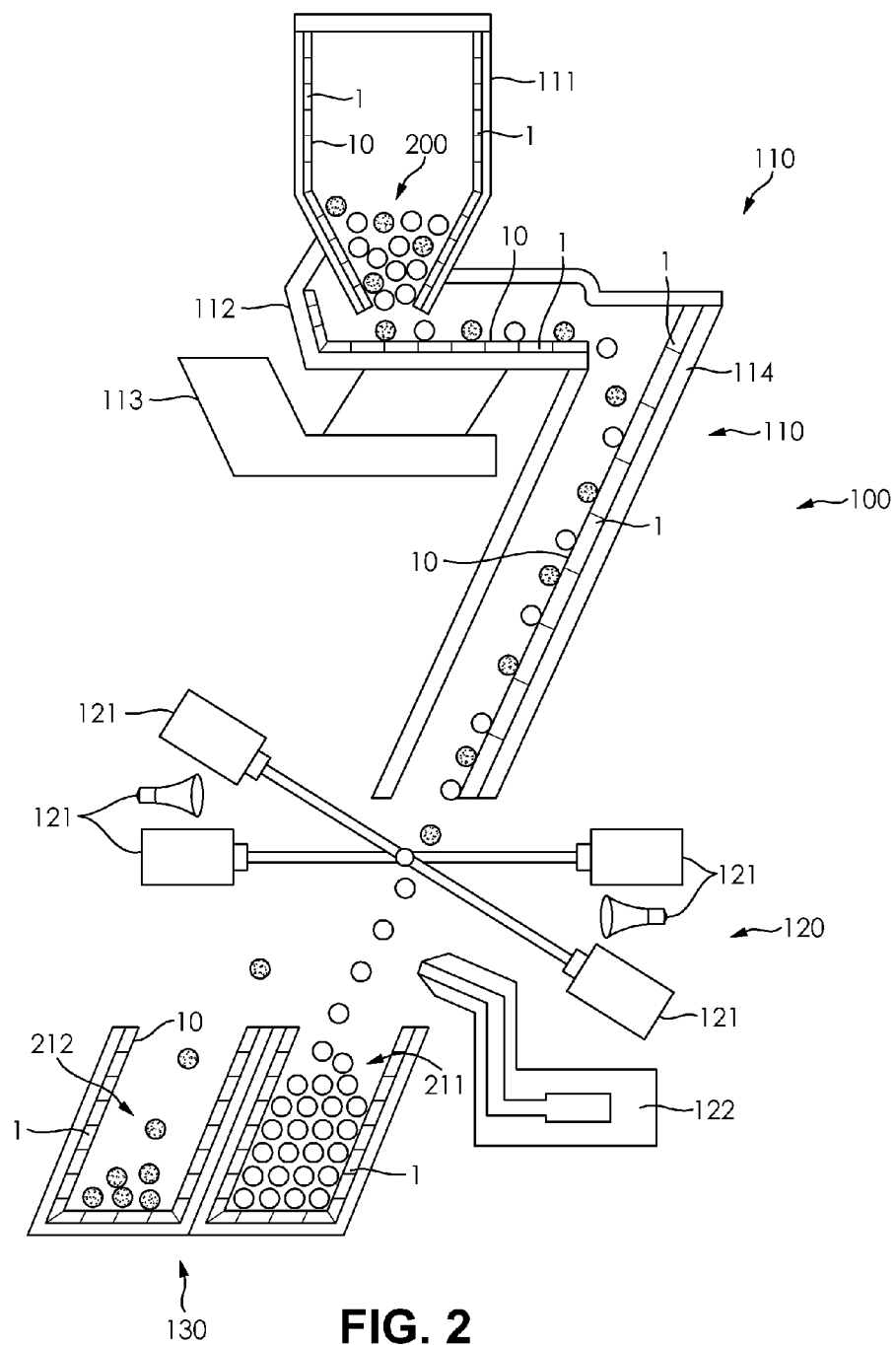
FIG. 2 is a schematic, cross-sectional view of a sorting apparatus including colored wear tiles in accordance with the present subject matter.

Optical sorting apparatuses are generally used for sorting foodstuffs, plastics, and other material. One typical sorting apparatus is shown for example in FIG. 2. It will be understood that the present subject matter is not limited to the apparatus as shown in FIG. 2, but can include other types of sorting apparatuses with different configurations. A sorting apparatus typically is constructed from stainless steel or other metal and usually comprises a number of components including a feed or delivery system 110 for transporting a material 200 to be sorted, and a sorting implement or divider 120 to separate the material into desired product 211 and undesired product 212. The feed can comprise material input hoppers 111, vibratory feeders/conveyors 112 including a vibrator 113, ducting, separators, silos, milling equipment, and chutes. The sorting implement 120 can comprise an optical system 121 for determining the characteristics of the material and/or identifying the at least two groups. The optical system 121 can include scanners, cameras, and/or sensors for detecting the characteristics of the material; various forms of lighting (including visible, UV, and x-ray) to properly illuminate the material, and computer controls for processing the information and for operation of the optical system. The optical system 121 communicates with an ejector 122 for separating the material into at least two groups. In one aspect, the ejector 122 is pneumatic and uses a burst of compressed air for separating the material. If any of the wear tiles, or portions or pieces thereof, mix with the material during sorting, the sorting implement 120 separates the wear tiles, or portions or pieces thereof, from the desired product based on at least color and/or lightness differences between the wear tile and desired product.

The sorting apparatus 100 can also include one or more receptacles 130 for ordering the sorted material 210. Other additional components can be included in the apparatus to facilitate the sorting of material.

Many of these components come into contact with the associated material to be sorted and are subject to wear therefrom, particularly the hopper 111, feeder 112, chute 114, and receptacle 130. The components of the sorting apparatus that are subject to wear have typical service lives of about a year depending on the operating conditions. In order to extend these service lives and to save cost on component replacement and machine down-time associated with repair, wear tiles 1 are applied to at least portions of such components in order to prevent the associated material from contacting the covered components. As shown in FIG. 2, the wear tiles 1 are applied to the inside surface of the hopper 111, a surface of the feeder 112, a surface of the chute 114, and an inside surface of the receptacle 130. In accordance with the present subject matter, it will be understood that the wear tiles can be applied to more or fewer surfaces or portions thereof than that depicted in FIG. 2. The wear tiles, so applied, are then subject to wear, rather than the covered surfaces of the components being subject to wear. Worn wear tiles can be more easily replaced than entire machine parts and new wear tiles are attached when desired.

Colored wear tiles that are used to prevent or inhibit wear on sorting machines are formed to suitably cover parts that are subject to wear and to prevent the parts from coming into contact with an associated material. For machine parts that are essentially flat, flat tile can be attached thereto in order to prevent wear to the parts. For parts that are contoured, tile that is contoured, or flat, can be utilized.

Wear tile can be applied over a machine part as one continuous piece, as overlapping tiles, as interlocking tiles, as abutted tiles, or combinations thereof in order to prevent wear. In one embodiment for curved parts of an apparatus, flat tile are applied that have an exposed surface 10 defining any shape and having a relatively smaller length 50 and width 60 dimension. In this embodiment, the tile has a length and width from about 0.5 to about 2.0 inches. These smaller tiles are useful because they can accommodate the curved surfaces of a contoured machine part. In one aspect, the relatively smaller tiles are pre-matted on a woven polymer backing or other suitable backing for ease of application. Tiles that are abutted, one side surface to another, can additionally have grout therebetween to protect the machine parts from wear.

In any case, the colored wear tile has a thickness 40 of about 0.60 inches or less in accordance with the present subject matter. This thickness ensures that the thickness of the wear tile does not interfere with the operation or material capacity of an optical sorter. Wear tile with thicknesses of 0.60 inches or less lining portions of the apparatus will not significantly block or interfere with the delivery system or pathways therein. Wear tile having thicknesses exceeding 0.60 inches tend to decrease the capacity of the sorter. In other words, the amount of material that can be processed by the sorter in a given amount of time can be reduced because the volume capacity in the hopper 111, feeder 112, chute 114, receptacle 130, and other covered portions is reduced when relatively thicker wear tile is attached thereto. Thus, the pathway for the associated material 200 is constricted with the use of thicker wear tile.

Colored wear tiles are attached to parts of the sorting apparatus by welding, adhesive (i.e., epoxy, room-temperature vulcanizing rubber, etc.), mechanical attachment (threaded bolt or screw, tongued and grooved tile, dovetail grooved tile, compression fitting tile), pre-matted tile, as pre-formed one-piece sections, or other known means, wherein the back surface 20 of the tile 1 is facing the intended part of the apparatus 100 to be covered.

Chosen color and/or lightness values for the desired product 211 are established for the sorting machine 100 along with an acceptable difference or range from these preferred values. The sorting apparatus is calibrated to accept material into the desired product portion 211 that is within the maximum acceptable difference from the established or preferred color and/or lightness values. Any portion of the material 200 that falls outside, rather than within, the maximum acceptable limits will be diverted to the undesired product portion 212 as shown in FIG. 2. The colored wear tile provides color and/or lightness contrasting sufficiently from the preferred color and/or lightness such that if the colored wear tile, or portions or pieces thereof, become mixed with the material, then the sorting apparatus will separate the colored wear tile from the desired product. The colored wear tile has a color and/or lightness that fall outside the maximum acceptable limits established for the desired product and is thus, separated from the desired product 211. In one aspect, the colored wear tile is separated into the undesired product 212.

Apparatuses in accordance with the present subject matter utilize colored wear tiles that have characteristics as described herein; such description being incorporated by reference in the instant apparatuses.

In one embodiment in accordance with the present subject matter, a sorting apparatus is provided comprising a feed, an implement, and wear tiles. The feed delivers a material to be sorted to the implement. The implement sorts the material into at least two groups based on one or more characteristics of the material including a color parameter, one of the at least two groups comprising desired product. The wear tiles cover a portion of the sorting apparatus to substantially prevent the material from contacting the covered portion of the sorting apparatus during sorting. The wear tiles have a color sufficiently different from a color of the desired product such that the wear tiles, or portions or pieces thereof that may mix with the material, are sorted by the implement from the desired product.

In another embodiment in accordance with the present subject matter, an apparatus is provided for separating portions of a material into a desired product portion and an undesired product portion, wherein the separating is based on perceptible characteristics of the material, one of the perceptible characteristics being color. The apparatus comprises a delivery system for transporting the material to be sorted; a divider for separating the desired product from the undesired product, and colored wear tiles covering portions of the apparatus that otherwise would be subject to wear from coming into contact with the material. The colored wear tiles have a color that permeates substantially an entire mass of the colored wear tiles. The color of the colored wear tiles is sufficiently different from the color of the material such that the divider is able to separate the colored wear tiles, or portions or pieces thereof that may mix with the material, from the desired product portion. The delivery system transports the material to the divider, and the divider separates the material.

In another embodiment, the sorting apparatus includes a receptacle that orders the sorted material. The receptacle can comprise one or more receptacles or containers. If only one, then the receptacle has means, such as for example walls or dividers, to keep the sorted material separated, for example separated into desired product 211 and undesired product 212 as shown in FIG. 2.

Methods

The present subject matter provides methods related to the use of the colored wear tile in sorting apparatuses. The methods provide for the separation of an associated material into a desired product and an undesired product and also provide for colored wear tile, or portions or pieces thereof that may become mixed with the associated material, to be separated from the desired product based on differences in the color and/or lightness of the colored wear tile and the desired product. The description of the colored wear tile and the apparatuses elsewhere provided, is incorporated herein by reference.

In one embodiment, a method is provided for separating a material into at least two groups based on characteristics of the material, the characteristics including a color parameter and a lightness parameter. The method comprises providing the material to be separated. The method includes providing a sorting apparatus having a feed, a sorting implement, and colored wear tiles; wherein the feed transports the material to the sorting implement, the sorting implement separates the material into at least two groups based on the characteristics of the material, the colored wear tiles cover portions of the apparatus to substantially prevent the covered portions from coming into contact with the material, and the colored wear tiles have a color and a lightness. The method also comprises passing the material through the sorting apparatus to separate the material into the at least two groups, one of the at least two groups comprising desired product having a color and lightness. The sorting implement separates the colored wear tiles, or portions or pieces thereof that may mix with the material, from the desired product based on differences between the color and lightness of the colored wear tiles and the color and lightness of the desired product.

In another embodiment in accordance with the present subject matter, a method is provided for protecting one or more surfaces of an optical sorting apparatus that are subject to wear. The apparatus is configured to sort a material based on characteristics including color. The wear is associated with the material contacting the one or more surfaces. The method comprises covering the one or more surfaces with colored wear tiles so as to substantially prevent the material from contacting the one or more surfaces. The material is sorted into two or more groups, one of the two or more groups comprising desired product having a color, another of the two or more groups comprising undesired product. The colored wear tiles have a color that permeates substantially an entire mass of the colored wear tiles, the color of the colored wear tiles being different from the color of the desired product. The colored wear tiles, or portions or pieces thereof that may mix with the material, are separated from the desired product by the apparatus on the basis of a difference between the color of the colored wear tiles and the color of the desired product.

In another embodiment, the material to be separated is rice, which comprises various shades of white. Other materials are also contemplated as being separated by the apparatuses and methods of the instant subject matter.

Many other benefits will no doubt become apparent from future application and development of this technology.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

EXAMPLES

The following examples are illustrative of the present subject matter and should not be construed to limit the scope thereof.

Example 1

A batch of a pre-fired composition according the present subject matter was developed. The composition provides upon forming and firing, wear tile having a brown color suitable for use in an optical sorting apparatus. The components, a. 866 lbs. AC-2 calcined alumina ($Al_2O_3$),
    b. 10 lbs. maganese dioxide ($MnO_2$),
    c. 5 lbs. titantium dioxide ($TiO_2$),
    d. 10 lbs. black iron oxide ($Fe_3O_4$),
    e. 61 lbs. C&C ball clay,
    f. 48 lbs. kyanite ($Al_2SiO_5$),
    g. 3 lbs. Darvan 821-A,
    h. 1 lbs. Foamaster A, and
    i. 47 gallons of water,
were mixed in a mill for 12 hours and 20,020 revolutions to produce median particle size of 3.0 μm±0.2 measured by a Sedigraph 5120 particle size analyzer. Thereafter,
    j. 31.6 lbs Duramax B1022,
    k. 8.7 lbs. Duramax B1000, and
    l. 6 lbs. CD202 (calcium stearate), were added to the mixture and milled for 1 hour and 1,7000 revolutions. The mixture was passed through a screen into a tank and blunged for 2 hours. The composition was spray dried, then cold pressed into desired shapes and fired in a kiln at 2500° F. for 45-90 minutes to produce brown wear tile.

Example 2

A batch of a pre-fired composition according the present subject matter was developed. The composition provides upon forming and firing, wear tile having a pink color suitable for use in an optical sorting apparatus. The components, a. 13,838 lbs AC-2 calcined alumina ($Al_2O_3$),
    b. 300 lbs. fluorspar ($CaF_2$),
    c. 150 lbs. chrome oxide ($Cr_2O_3$),
    d. 525 lbs. C&C ball clay,
    e. 187 lbs. American talc,
    f. 12 lbs. tannic acid,
    g. 43 lbs. Darvan 821-A, and
    h. 7 lbs. Foamaster A,
were mixed in a mill with water for 12 hours and 20,020 revolutions to produce median particle size of 3.0 μm±0.2 measured by a Sedigraph 5120 particle size analyzer. Thereafter,
    i. 474 lbs. Duramax B1022,
    j. 130 lbs Duramax B100, and
    k. 90 lbs. CD202 (calcium stearate),
were added to the mixture and milled for 1 hour and 1,7000 revolutions. The mixture was passed through a screen into a tank and blunged for 2 hours. The composition was spray dried, then cold pressed into desired shapes and fired in a kiln at 2500° F. for 45-90 minutes to produce pink wear tile.

Example 3

A batch of a pre-fired composition according the present subject matter was developed. The composition provides upon forming and firing, wear tile having a pink color suitable for use in an optical sorting apparatus. The components, a. 13,838 lbs. AC-2 calcined alumina ($Al_2O_3$),
    b. 300 lbs. fluorspar ($CaF_2$),
    c. 150 lbs. chrome oxide ($Cr_2O_3$),
    d. 525 lbs. C&C ball clay,
    e. 187 lbs. American talc,
    f. 12 lbs. tannic acid,
    g. 63 lbs. Selvol™ 203,
    h. 43 lbs, Darvan 821-A,
    i. 7 lbs. Foamaster A,
were mixed in a mill with water for 12 hours and 20,020 revolutions to produce median particle size of 3.0 μm±0.2 measured by a Sedigraph 5120 particle size analyzer. Thereafter, j. 150 lbs. PEG 4000,
k. 63 lbs. PEG 8000, and
l. 90 lbs. CD202 (calcium stearate), were added to the mixture and milled for 1 hour and 1,7000 revolutions. The mixture was passed through a screen into a tank and blunged for 2 hours. The composition was spray dried, then cold pressed into desired shapes and fired in a kiln at 2500° F. for 45-90 minutes to produce pink wear tile.

Example 4

A batch of a pre-fired composition according the present subject matter was developed. The composition provides upon forming and firing, wear tile having a brown color suitable for use in an optical sorting apparatus. The components,
 a. 12,825 lbs. AC-2 calcined alumina ($Al_2O_3$),
 b. 150 lbs. manganese dioxide ($MnO_2$),
 c. 150 lbs. black iron oxide ($Fe_3O_4$),
 d. 1,050 lbs. C&C ball clay,
 e. 450 lbs. American talc,
 f. 75 lbs. titanium dioxide ($TiO_2$),
 g. 300 lbs. Kyanite ($Al_2SiO_5$),
 h. 43 lbs, Darvan 821-A,
 i. 8 lbs. Foamaster A, were mixed in a mill with water for 12 hours and 20,040 revolutions to produce median particle size of 3.0 µm±0.2 measured by a Sedigraph 5120 particle size analyzer. Thereafter,
 j. 474 lbs. Duramax B1022,
 k. 130 lbs. Duramax B100, and
 l. 90 lbs. CD202 (calcium stearate), were added to the mixture and milled for 1 hour and 1,7000 revolutions. The mixture was passed through a screen into a tank and blunged for 2 hours. The composition was spray dried, then cold pressed into desired shapes and fired in a kiln at 2500° F. for 45-90 minutes to produce brown wear tile.

Example 5

A batch of a pre-fired composition according the present subject matter was developed. The composition provides upon forming and firing, wear tile having a pink color suitable for use in an optical sorting apparatus. The components,
 a. 12,990 lbs. AC-2 calcined alumina ($Al_2O_3$),
 b. 330 lbs. Stonelite ($CaMg(CO_3)_2$—$Fe_2O_3$) or microfine dolomite ($CaMg(CO_3)_2$,
 c. 300 lbs. chrome oxide ($Cr_2O_3$),
 d. 750 lbs. C&C ball clay,
 e. 330 lbs. Milwhite TDM 92 talc,
 f. 600 lbs. Kyanite ($Al_2SiO_5$),
 g. 43 lbs, Darvan 821-A,
 h. 8 lbs. Foamaster A, were mixed in a mill with water for 20 hours and 16,800 revolutions to produce median particle size of 3.0 µm±0.2 measured by a Sedigraph 5120 particle size analyzer. Thereafter,
 i. 474 lbs. Duramax B1022,
 j. 130 lbs. Duramax B100, and
 k. 90 lbs. CD202 (calcium stearate), were added to the mixture and milled for 1 hour and 840 revolutions. The mixture was passed through a screen into a tank and blunged for 2 hours. The composition was spray dried, then cold pressed into desired shapes and fired in a kiln at 2500° F. for 45-90 minutes to produce pink wear tile.

Example 6

A batch of a pre-fired composition according the present subject matter was developed. The composition provides upon forming and firing, wear tile having a black color suitable for use in an optical sorting apparatus. The components,
 a. 7,200 lbs. GMU-C grade calcined alumina ($Al_2O_3$),
 b. 240 lbs. $TiO_2$,
 c. 60.3 lbs. cobalt oxide (CoO),
 d. 60.3 lbs. black iron oxide ($Fe_3O_4$),
 e. 60.3 lbs. black nickel oxide (NiO),
 f. 397 lbs. EPK clay,
 g. 27 lbs, Darvan 821-A,
 h. 4 lbs. Foamaster A,
 i. a 10% Selvol 203 aqueous solution, wherein 80 lbs. of Selvol 203 dispersant was mixed with 86 gallons of water, were mixed in a mill with water for 6 hours and 6,720 revolutions to produce median particle size of 3.0 µm±0.2 measured by a Sedigraph 5120 particle size analyzer. Thereafter,
 j. 80 lbs. PEG 4000 and/or PEG 4600,
 k. 64 lbs. CD202 (calcium stearate), were added to the mixture and milled for 1 hour and 840 revolutions. The mixture was passed through a screen into a tank and blunged for 2 hours. The composition was spray dried, then cold pressed into desired shapes and fired in a kiln at 2500° F. for 45-90 minutes to produce a black wear tile.

Example 7

A batch of a pre-fired composition according the present subject matter was developed. The composition provides upon forming and firing, wear tile having a blue color suitable for use in an optical sorting apparatus. The components:
 a. 13,290 lbs. AC-2 calcined alumina ($Al_2O_3$)
 b. 530 lbs. Kyanite ($Al_2SiO_5$),
 c. 640 lbs. C&C ball clay,
 d. 270 lbs. Milwhite TDM 92 talc,
 e. 270 lbs. Stonelite ($CaMg(CO_3)_2$—$Fe_2O_3$) or microfine dolomite ($CaMg(CO_3)_2$,
 f. 23 lbs. cobalt oxide (CoO),
 g. 43 lbs, Darvan 821-A,
 h. 7 lbs. Foamaster A,
 i. 63 lbs. Selvol 203, were mixed in a mill with water for 30 hours and 25,200 revolutions to produce median particle size of 2.8 µm±0.2 µm measured by a Sedigraph 5120 particle size analyzer. Thereafter,
 j. 150 lbs. PEG 4000 and/or PEG 4600,
 k. 63 lbs. PEG 8000,
 l. 75 lbs. CD202 (calcium stearate), were added to the mixture and milled for 30 minutes and 722 revolutions. The mixture was passed through a screen into a tank and blunged for 2 hours. The composition was spray dried, then cold pressed into desired shapes and fired in a kiln at 2500° F. for 45-90 minutes to produce a blue wear tile.

The principles, embodiments and modes of operation of the present subject matter have been described in the foregoing specification. The present subject matter is not to be construed as being limited to the particular forms disclosed, since these are to be regarded as illustrative rather than restrictive. Variations and changes may be made by those skilled in the art without departing from the spirit of the present subject matter.

What is claimed is:

1. A method for protecting a surface of an optical sorting apparatus that is subject to wear, the apparatus being configured to sort a material based on characteristics including color, the wear being associated with the material contacting the surface, the method comprising covering the surface with a colored wear tile so as to substantially prevent the material from contacting the surface, wherein:

the material is sorted into two or more groups, one of the two or more groups comprising desired product having a color;

the colored wear tile has a color that permeates substantially an entire mass of the colored wear tile, the color of the colored wear tile being different from the color of the desired product;

the colored wear tile, or portions or pieces thereof, that may mix with the material is separated from the desired product by the apparatus on the basis of a difference between the color of the colored wear tile and the color of the desired product, and the colored wear tile is produced by firing a composition at or above about 2500° F. from about 45 minutes to about 90 minutes, the composition being selected from the group consisting of, i. Composition A comprising prior to firing,
  a. $Al_2O_3$ from about 75 wt. % to about 98 wt. %,
  b. $MnO_2$ from about 0.25 wt. % to about 3.5 wt. %,
  c. $TiO_2$ from about 0.1 wt. % to about 2.5 wt. %,
  d. $Fe_3O_4$ from about 0.1 wt. % to about 2.5 wt. %,
  e. clay from about 0 wt. % to about 10 wt. %,
  f. $Al_2SiO_5$ from about 0.01 wt. % to about 8.0 wt. %,
  g. talc from about 0 wt. % to about 2.5 wt. %,
  h. dispersant from about 0 wt. % to about 2.0 wt. %,
  i. defoamer from about 0 wt. % to about 1.0 wt. %,
  j. binder from about 0.1 wt. % to about 10 wt. %, and
  k. calcium stearate from about 0 wt. % to about 4.5 wt. %;

ii. Composition B comprising prior to firing,
  a. $Al_2O_3$ from about 75 wt. % to about 98 wt. %,
  b. $CaF_2$ from about 0.1 wt. % to about 4.0 wt. %,
  c. $Cr_2O_3$ from about 0.05 wt. % to about 3.0 wt. %,
  d. clay from about 0 wt. % to about 4.5 wt. %,
  e. talc from about 0 wt. % to about 4.0 wt. %,
  f. tannic acid from about 0 wt. % to about 3.5 wt. %,
  g. dispersant from about 0 wt. % to about 3.0 wt. %,
  h. defoamer from about 0 wt. % to about 2.0 wt. %,
  i. binder from about 0 wt. % to about 10.0 wt. %, and
  j. calcium stearate from about 0 wt. % to about 4.5 wt. %;

iii. Composition C comprising prior to firing,
  a. $Al_2O_3$ from about 75 wt. % to about 98 wt. %,
  b. $Al_2SiO_5$ from about 0.01 wt. % to about 8.0 wt. %,
  c. $Cr_2O_3$ from about 0.05 wt. % to about 3.0 wt. %,
  d. clay from about 0 wt. % to about 10.0 wt. %,
  e. talc from about 0 wt. % to about 4.0 wt. %,
  f. Stonelite ($CaMg(CO_3)_2$—$Fe_2O_3$) or dolomite ($CaMg(CO_3)_2$) from about 0 wt. % to about 3.5 wt. %,
  g. dispersant from about 0 wt. % to about 3.0 wt. %,
  h. defoamer from about 0 wt. % to about 2.0 wt. %,
  i. binder from about 0 wt. % to about 10.0 wt. %, and
  j. calcium stearate from about 0 wt. % to about 4.5 wt. %;

iv. Composition D comprising prior to firing,
  a. $Al_2O_3$ from about 75 wt. % to about 98 wt. %,
  b. $TiO_2$ from about 0.5 wt. % to about 5.0 wt. %,
  c. CoO from about 0 wt. % to about 3.0 wt. %,
  d. $Fe_3O_4$ from about 0 wt. % to about 3.0 wt. %,
  e. $NiO_2$ from about 0 wt. % to about 3.0 wt. %,
  f. Kaolin clay ($Al_2Si_2O_5(OH)_4$) from about 1.0 wt. % to about 8.0 wt. %,
  g. dispersant from about 0 wt. % to about 3.0 wt. %,
  h. defoamer from about 0 wt. % to about 2.0 wt. %,
  i. binder from about 0 wt. % to about 5.0 wt. %, and
  j. calcium stearate from about 0 wt. % to about 3.5 wt. %; and v. Composition E comprising prior to firing,
  a. $Al_2O_3$ from about 75 wt. % to about 98 wt. %,
  b. $Al_2SiO_5$ from about 0.5 wt. % to about 8.0 wt. %,
  c. clay from about 0 wt. % to about 10.0 wt. %,
  d. talc from about 0 wt. % to about 4.0 wt. %,
  e. Stonelite ($CaMg(CO_3)_2$—$Fe_2O_3$) or dolomite ($CaMg(CO_3)_2$) from about 0 wt. % to about 3.5 wt. %,
  f. CoO from about 0 wt. % to about 3.0 wt. %,
  g. dispersant from about 0 wt. % to about 3.0 wt. %,
  h. defoamer from about 0 wt. % to about 2.0 wt. %,
  i. binder from about 0 wt. % to about 5.0 wt. %, and
  j. calcium stearate from about 0 wt. % to about 3.5 wt. %.

2. The method according to claim 1, wherein the wear tile is produced by firing Composition A and is brown, and wherein Composition A comprises prior to firing:
  a. $Al_2O_3$ from about 75 wt. % to about 98 wt. %,
  b. $MnO_2$ from about 0.5 wt. % to about 2.0 wt. %,
  c. $TiO_2$ from about 0.1 wt. % to about 1.5 wt. %,
  d. $Fe_3O_4$ from about 0.1 wt. % to about 1.5 wt. %,
  e. clay from about 1.0 wt. % to about 3.5 wt. %,
  f. $Al_2SiO_5$ from about 0.5 wt. % to about 6.0 wt. %,
  g. talc from about 0.2 wt. % to about 1.5 wt. %,
  h. dispersant from about 0.2 wt. % to about 0.6 wt. %,
  i. defoamer from about 0.05 wt. % to about 0.2 wt. %,
  j. binder from about 0.5 wt. % to about 8.0 wt. %, and
  k. calcium stearate from about 0.3 wt. % to about 3.5 wt. %.

3. The method according to claim 1, wherein the wear tile is produced by firing Composition B and is pink, and wherein Composition B comprises prior to firing:
  a. $Al_2O_3$ from about 75 wt. % to about 98 wt. %,
  b. $CaF_2$ from about 0.5 wt. % to about 3.0 wt. %,
  c. $Cr_2O_3$ from about 0.1 wt. % to about 2.0 wt. %,
  d. clay from about 1.0 wt. % to about 3.5 wt. %,
  e. talc from about 0.2 wt. % to about 3.0 wt. %,
  f. tannic acid from about 0.05 wt. % to about 2.0 wt. %,
  g. dispersant from about 0.2 wt. % to about 1.0 wt. %,
  h. defoamer from about 0.02 wt. % to about 0.2 wt. %,
  i. binder from about 0.7 wt. % to about 7.5 wt. %, and
  j. calcium stearate from about 0.1 wt. % to about 3.5 wt. %.

4. The method according to claim 1, wherein:
the colored wear tile comprises prior to firing, non-volatile components comprising at least 85 wt. % $Al_2O_3$;
the colored wear tile has an exposed surface defined by a square shape, a rectangle shape, a circular shape, or a hexagon shape;
the colored wear tile has a thickness of less than about 0.60 inches;
the colored wear tile has a lightness of about 90 or less measured with a CIE D65 illuminant at 10 degrees;
a DE value between the colored wear tile and the desired product is equal to or greater than 10; and
the colored wear tile has a Vickers hardness from about 900HV5 to about 1350HV5.

5. The method according to claim 1, wherein a DE value between the wear tile and the desired product is equal to or greater than 10.

6. The method according to claim 1, wherein the wear tile has a lightness that is 90 or less measured with a CIE D65 illuminant at 10 degrees.

7. The method according to claim 1, wherein the wear tile has an exposed surface defined by a square shape, a rectangle shape, a circular shape, or a hexagon shape, and has a thickness of less than about 0.60 inches.

8. The method according to claim 1, wherein the wear tile has a Vickers hardness from about 900HV5 to about 1350HV5.

9. The method according to claim 8, wherein the wear tile has a Vickers hardness from about 1100HV5 to about 1350HV5.

10. The method according to claim 1, wherein the wear tile is mounted to the surface by one selected from the group consisting of an adhesive, a weld, a mechanical attachment, and combinations thereof.

* * * * *